(12) United States Patent
Debler et al.

(10) Patent No.: US 10,065,591 B2
(45) Date of Patent: Sep. 4, 2018

(54) OCCUPANT RESTRAINING SYSTEM FOR A VEHICLE (71) Applicant: TRW AUTOMOTIVE GMBH, Alfdorf (DE)

(72) Inventors: Jens Debler, Iggingen (DE); Maciej Sadowski, Czestochowa (PL)

(73) Assignee: TRW Automotive GmbH (DE)

( * ) Notice: Subject to any disclaimer, the term of this patent is extended or adjusted under 35 U.S.C. 154(b) by 20 days.

(21) Appl. No.: 15/512,950

(22) PCT Filed: Sep. 15, 2015

(86) PCT No.: PCT/EP2015/001843
§ 371 (c)(1),
(2) Date: Mar. 21, 2017

(87) PCT Pub. No.: WO2016/045775
PCT Pub. Date: Mar. 31, 2016

(65) Prior Publication Data
US 2017/0297525 A1 Oct. 19, 2017

(30) Foreign Application Priority Data
Sep. 24, 2014 (DE) .................. 10 2014 013 866

(51) Int. Cl.
B60R 21/213 (2011.01)
B60R 21/217 (2011.01)
B60R 21/232 (2011.01)

(52) U.S. Cl.
CPC ........ *B60R 21/213* (2013.01); *B60R 21/2176* (2013.01); *B60R 21/232* (2013.01)

(58) Field of Classification Search
CPC .. B60R 21/213; B60R 21/2176; B60R 21/232
See application file for complete search history.

(56) References Cited

U.S. PATENT DOCUMENTS

| 2003/0146609 | A1 | 8/2003 | Mueller | |
| 2004/0251668 | A1* | 12/2004 | Schneider | ............. B60R 21/237 280/743.1 |
| 2005/0001412 | A1* | 1/2005 | Schneider | ............. B60R 21/232 280/730.1 |

(Continued)

FOREIGN PATENT DOCUMENTS

| DE | 19610529 | 9/1997 | |
| DE | 10039800 A1 * | 2/2002 | ........... B60R 21/214 |

(Continued)

Primary Examiner — Faye M Fleming
(74) Attorney, Agent, or Firm — Tarolli, Sundheim, Covell & Tummino LLP (57) ABSTRACT The invention relates to an occupant restraint system (10) for a vehicle comprising a roof cross member (12) which extends transversely to a longitudinal vehicle axis (A) and is part of a body of the vehicle, an airbag module (14) which includes an airbag (16) and in a non-actuated initial state is accommodated inside the roof cross member (12), wherein the roof cross member (12) has a front side (18) facing a front end of the vehicle and an opposite rear side (20) facing a rear end of the vehicle, and wherein the front side (18) or the rear side (20) of the roof cross member (12) includes a mounting opening (22) for receiving the airbag module (14).

19 Claims, 4 Drawing Sheets (56) References Cited

U.S. PATENT DOCUMENTS

2009/0127833 A1 5/2009 Rick
2010/0327567 A1* 12/2010 Choi .................... B60R 21/214
　　　　　　　　　　　　　　　　　　　　280/730.2

FOREIGN PATENT DOCUMENTS

| DE | 10223684 | 12/2003 |
| DE | 10238822 | 3/2004 |
| DE | 10206042375 | 3/2008 |
| FR | 2905327 | 8/2008 |
| JP | H0680057 | 3/1994 |
| JP | H07117605 | 5/1995 |
| JP | 10264761 A * | 10/1998 |

* cited by examiner

OCCUPANT RESTRAINING SYSTEM FOR A VEHICLE

RELATED APPLICATIONS

This application corresponds to PCT/EP2015/001843, filed Sep. 15, 2015, which claims the benefit of German Application No. 10 2014 013 886.6, filed Sep. 24, 2014, the subject matter of which are incorporated herein by reference in its entirety.

BACKGROUND OF THE INVENTION

The invention relates to an occupant restraint system for a vehicle comprising an airbag module which includes an airbag, especially a front airbag.

Vehicle occupant restraint systems of this type are generally known from prior art, wherein usually the front airbag for a passenger is located behind an instrument panel of the vehicle end, upon release of the airbag module, deploys through an opening in the instrument panel toward the passenger. The installation space required for the airbag module behind the instrument panel entails a reduced available space for the passenger and/or reduced storage space in the area of the instrument panel.

Deviating from the accommodation behind the instrument panel, so called bag-in-roof passenger airbag modules are known which are arranged in the area of the front roof edge between the vehicle body and the roof lining and are fastened to the roof cross member.

SUMMARY OF THE INVENTION

It is the object of the invention to provide an occupant restraint system for a vehicle in which the space required for the airbag module has hardly any effect or, ideally, no effect at all on the space available in the vehicle interior.

In accordance with the invention, this object is achieved by an occupant restraint system comprising a roof cross member which extends transversely to a longitudinal vehicle axis and constitutes part of a body of the vehicle, an airbag module comprising an airbag and being accommodated inside the roof cross member in a non-actuated starting position, wherein the roof cross member has a front side facing a front end of the vehicle as well as an opposite rear side facing a rear end of the vehicle, and wherein the front side or the rear side of the roof cross member includes a mounting opening for receiving the airbag module. As the airbag module is integrated in the roof cross member of the vehicle body which is present anyway, no significant installation space for the airbag module is required in the vehicle interior. Depending on the packing size of the airbag module and on required feed lines, fastening means or covers, merely minor adaptations are required in the area of the roof cross member which have hardly any influence on the space available in the vehicle interior, however.

According to an embodiment of the occupant restraint system, the roof cross member is a hollow section, for example made from metal. For reasons of weight and cost, as a rule hollow sections have been used already as roof cross members for vehicles, wherein the cavity thereof that has not been utilized so far now will be advantageously used as installation space for the airbag module.

Preferably the front side or the rear side of the roof cross member has a deployment opening for the airbag of the airbag module. This arrangement of the deployment opening has turned out to be especially advantageous, when the airbag is used as front airbag for a vehicle occupant. Especially preferred, the airbag is used for restraining a passenger, with a use for restraining passengers in the rear compartment being imaginable as well, however.

One embodiment of the occupant restraint system provides that the deployment opening corresponds to a portion of the mounting opening or is identical to the mounting opening. Consequently, one single opening in the roof cross member is used both for the assembly of the airbag module and (at least partially) for the deployment of the airbag. Hence undesired structural weakening of the roof cross member is minimized and the load-bearing capacity of the vehicle body is not excessively impaired.

Preferably, in this embodiment at least one opening is provided on the side of the roof cross member opposed to the mounting opening for the passage of at least one of the following components:
 ignition connection for actuating the airbag module;
 fastening screw for locking the airbag module on the roof cross member.

Moreover, there may be provided a cover which covers the mounting opening after assembly of the airbag module and includes the deployment opening. The cover is a stable cover sheet, for example, and is fastened on the roof cross member so that it cooperates in bearing load especially as regards the lateral force. Since the deployment opening especially has a smaller size than the mounting opening, the weakening of the roof cross member is reduced by the cover in a simple manner.

The cover especially has a U-shaped cross-section and is preferably attached with its lateral legs on the outside of an upper side and a lower side of the roof cross member, in this way, a static cooperation of the cover can be realized with little effort and the local weakening of the roof cross member can be at least partially compensated.

Preferably, the front side of the roof cross member includes a deployment opening for the airbag of the airbag module, with the airbag being a front airbag, especially a passenger front airbag. By forward deployment of the airbag the front screen can be advantageously used, when the airbag is used as passenger front airbag, initially as an airbag guide during deployment of the airbag and after that as an airbag support upon impact of the occupant.

The airbag module is preferably fastened to the rear side of the roof cross member, especially screwed with the roof cross member. This allows for realizing reliable assembly of the airbag module tightly to the body with minimum effort.

According to another embodiment of the occupant restraint system, the airbag module includes an inflator comprising a generator plate, wherein the generator plate covers the mounting opening of the roof cross member in an assembled state of the airbag module. In this embodiment, the rear side of the roof cross member preferably includes the mounting opening for the airbag of the airbag module. Furthermore, the generator plate is especially a generator sheet which is fastened to the roof cross member while being in static cooperation and consequently reduces the local weakening of the roof cross member in the area of the mounting opening.

Especially preferred, the generator plate is positively connected to the roof cross member in a mounted state of the airbag module. As an alternative or in addition, also an adhesive material connection is imaginable, as a matter of course.

For the rest, the roof cross member may have a lower side facing an interior of the vehicle as well as an opposite upper side facing an outer roof panel of the vehicle, the lower side and the upper side defining a height of the roof cross member that decreases in the axial direction from the rear side toward the front side. When using the airbag as a passenger front airbag, said compact wedge-shaped cross-section of the roof cross member entails especially large freedom of movement for the occupant in the area of the headspace. Such cross-sectional shape of the roof cross member is suited especially for embodiments in which the rear side of the roof cross member includes the mounting opening for receiving the airbag module.

In accordance with a further embodiment of the occupant restraint system, the airbag module includes an inflator and a module casing, wherein at least the airbag is accommodated in the module casing. Preferably, the module casing merely consists of a flexible protective sheathing. A further rigid module casing is not required, as the function thereof, for example the absorption of energy upon igniting the inflator, is adopted by the roof cross member. The flexible protective sheathing especially is a fabric sheathing and merely serves for fixing the airbag in its folded state as well as for protecting the airbag and/or the inflator.

In an embodiment of the occupant restraint system, the mounting opening substantially extends over the entire height of the roof cross member on the respective side thereof. In this way, the airbag module can be inserted into and mounted within the interior of the roof cross member in an especially simple manner.

Further, the roof cross member may have a bent shape when viewed transversely to the longitudinal vehicle axis. Such bent cross-sectional shape of the roof cross member may entail advantages both regarding the headroom of the vehicle occupants and in respect of the design and the external shape of the vehicle in view of minimizing the wind resistance.

In accordance with another embodiment of the occupant restraint system, the airbag module may be arranged above a sun visor of the vehicle.

BRIEF DESCRIPTION OF THE DRAWINGS

Further features and advantages of the invention will be evident from the following description of preferred embodiments with reference to the drawings, wherein.

DESCRIPTION

Each of FIGS. 1 through 9 illustrates a schematic sketch of an occupant restraint system 10 for a vehicle having a longitudinal vehicle axis A which extends from a front end to a rear end of the vehicle.

Figure 2:
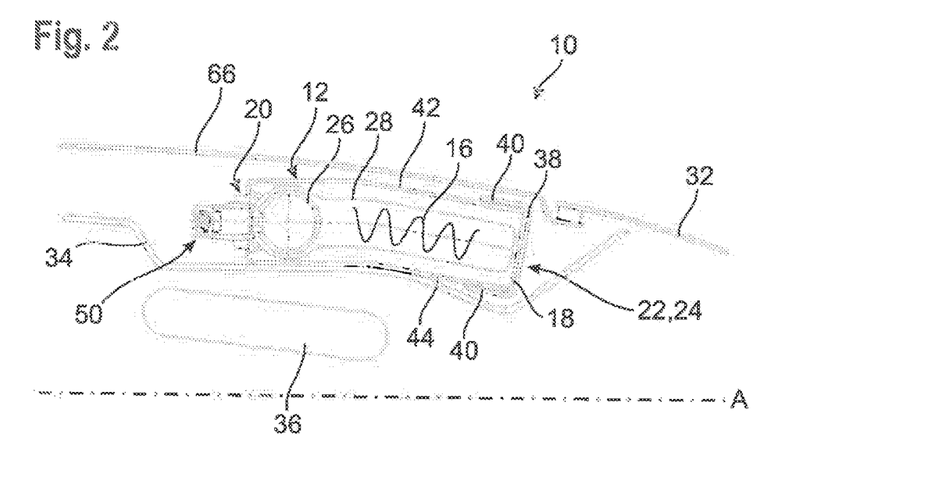
FIG. 2 shows the longitudinal section detail according to FIG. 1 after the assembly of the airbag module.
Figure 7:
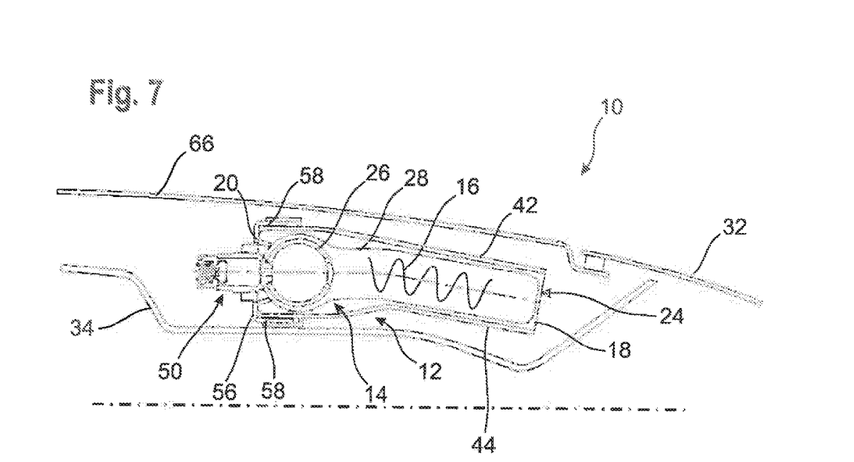
FIG. 7 shows the longitudinal section detail according to FIG. 6 after the assembly of the airbag module.
Figure 8:
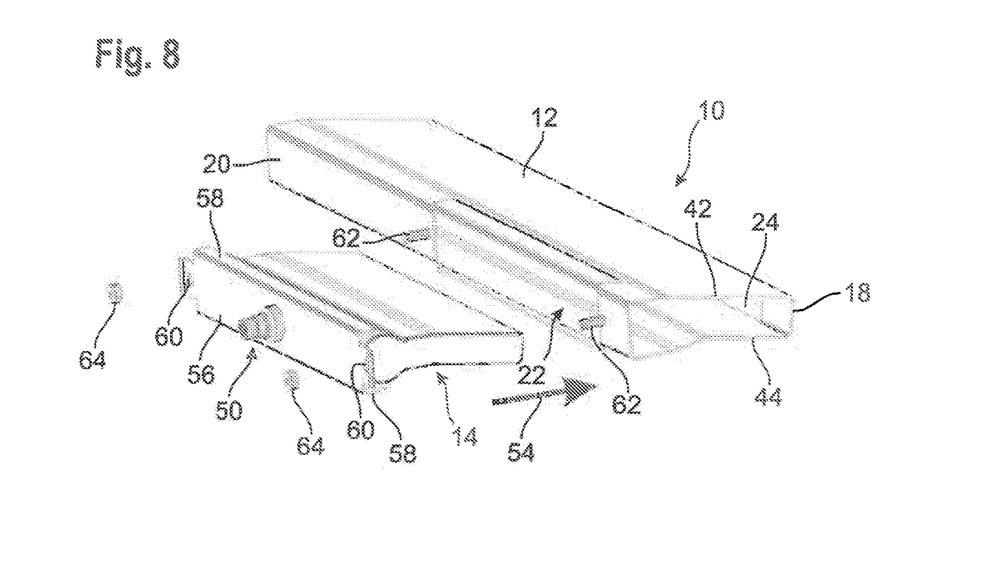
FIG. 8 shows a perspective cutout of the occupant restraint system according to FIG. 6 prior to the assembly of the airbag module.

The occupant restraint system 10 comprises a roof cross member 12 which extends transversely, especially vertically to the longitudinal vehicle axis A and is part of a body of the vehicle, as well as an airbag module 14 which includes an airbag 16 and is accommodated in the interior of the roof cross member 12 in a non-actuated initial state (cf. FIGS. 2 and 7, for example).

The roof cross member 12 is a hollow section and has a front side 18 facing the front end of the vehicle as well as an opposite rear side 20 facing the rear end of the vehicle. The front side 18 or the rear side 20 of the roof cross member 12 include a mounting opening 22 for receiving the airbag module 14 and/or a deployment opening 24 for the airbag 16 of the airbag module 14. Moreover, the roof cross member 12 has a lower side 44 facing an interior of the vehicle as well as an opposite upper side 42 facing an outer roof panel 66 of the vehicle, the lower side 44 and the upper side 42 defining a height of the roof cross member 12.

The roof cross member 12 is made from sheet steel according to the present embodiments, wherein also other materials suited for body components such as aluminum, carbon or plastic may be utilized.

Figure 1:
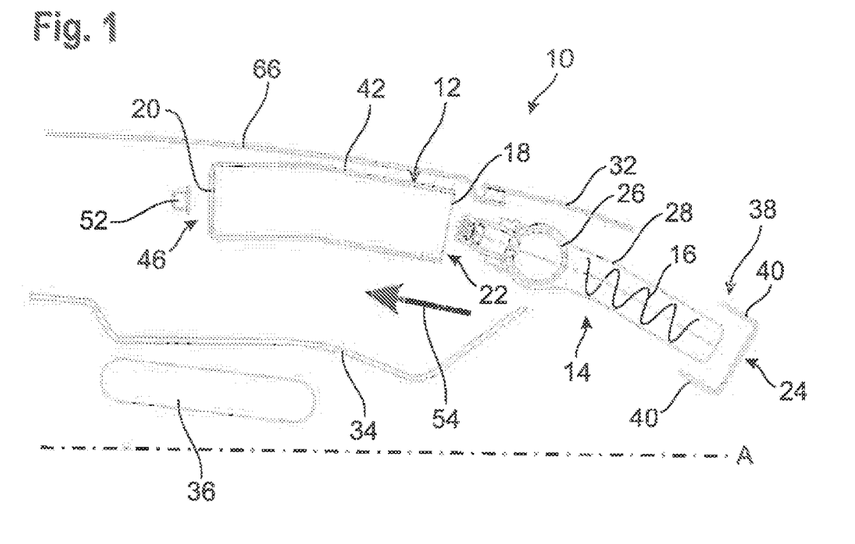
FIG. 1 shows a longitudinal section detail of a vehicle in the area of an occupant restraint system according to the invention prior to the assembly of an airbag module.
Figure 6:
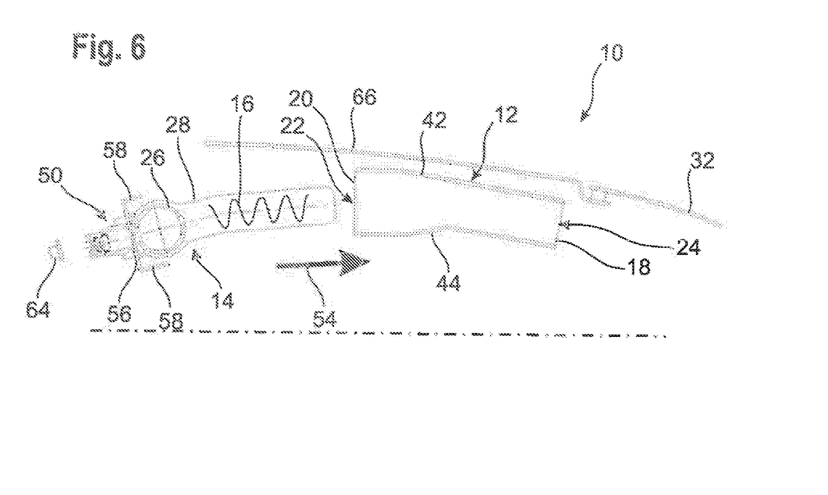
FIG. 6 shows a longitudinal section detail of a vehicle in the area of an occupant restraint system according to the invention in accordance with another embodiment prior to the assembly of an airbag module.

Especially by way of the FIGS. 1 and 6 it is clearly evident that in the shown embodiments of the occupant restraint system 10 the roof cross member 12 has a bent shape when viewed transversely to the longitudinal vehicle axis A. Such bent cross-sectional shape of the roof cross member 12 is chosen, for example, for reasons of design and for optimizing the wind resistance of the vehicle or the headroom of the occupant. The airbag module 14 can be easily inserted into the interior of the roof cross member 12 even with such slightly bent cross-sectional shape of the roof cross member 12, as the folded airbag 16 is sufficiently flexible so as to adapt to the cross-sectional form.

As is indicated in FIGS. 1, 2, 6 and 7, the airbag module 14 comprises an inflator 26 and a module casing 28, wherein at least the airbag 16, but preferably the inflator 28 as well, is/are accommodated in the module casing 28. The module casing 28 merely consists of a flexible protective sheathing which fixes the airbag 16 as "airbag package" in its folded position and ruptures upon actuation of the airbag module 14. Further, the flexible protective sheathing may protect the airbag 16 as well as the inflator 26, where necessary, against damage, especially damage caused by transport or assembly.

Although the airbag 16 is fixed by the flexible protective sheathing in its folded state, the folded airbag package including the protective sheathing is still sufficiently flexible, however, so as to adapt to a slightly bent cross-sectional shape of the roof cross member 12, for example.

The flexible protective sheathing is especially a fabric sheathing, wherein also other protective sheathings, for example made of a thin plastic film, would be possible, however.

Upon actuation of the airbag module 14 the energy upon ignition of the inflator 26 may be easily absorbed by the roof cross member 12, therefore no further stiff or inherently rigid module casing is required apart from the flexible protective sheathing. Consequently, an especially compact airbag module 14 is resulting which can be easily accommodated in the roof cross member 12 without the previously common cross-sections of the roof cross members 12 having to be considerably varied or especially increased. Moreover, by dropping a rigid module casing the costs and the weight of the airbag module 14 can be reduced.

Figure 5:
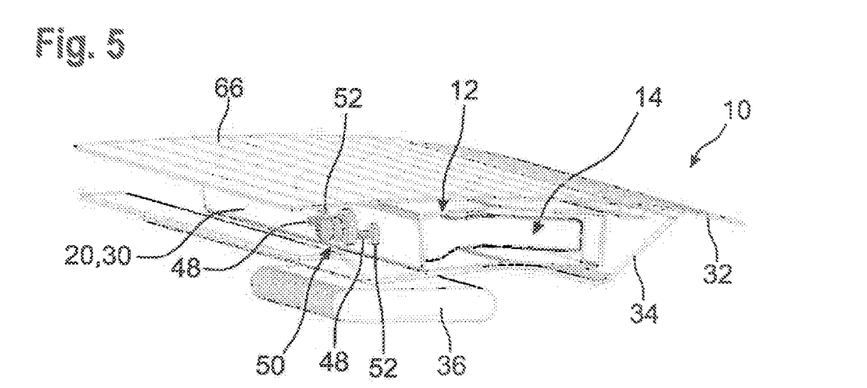
FIG. 5 shows another perspective cutout of the vehicle according to FIG. 3 after the assembly of the airbag module.
Figure 9:
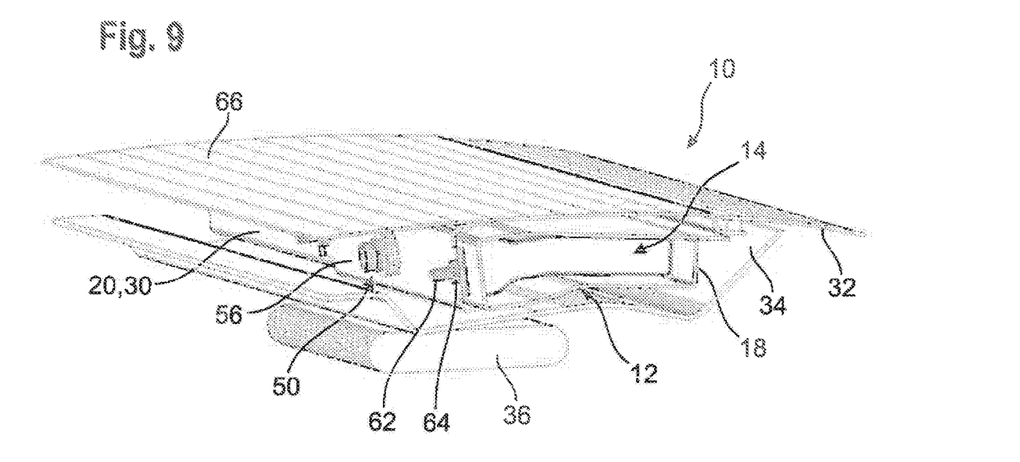
FIG. 9 shows a perspective cutout of the vehicle according to FIG. 6 after the assembly of the airbag module.

For fixing the airbag module 14 transversely to the longitudinal vehicle axis A within the roof cross member 12 and for being capable of transferring the energy to the roof cross member 12 when the inflator 26 is triggered, the airbag module 14 according to FIGS. 5 and 9 is fastened on the rear side 20 of the roof cross member 12, wherein especially the inflator 28 of the airbag module 14 is screwed to a rear wall 30 of the roof cross member 12.

Accordingly, the front side 18 of the roof cross member 12 includes the deployment opening 24 for the airbag 16 of the airbag module 14, with the airbag 16 being a front airbag.

In accordance with the shown embodiments, the airbag module 14 is arranged, in its non-actuated initial state, approximately in the area above a sun visor 36 of the vehicle (cf. FIGS. 5 and 9, for example). Concretely, the airbag 16 is a passenger front airbag which, upon actuation of the airbag module 14, exits the roof cross member 12 through the deployment opening 24 end deploys initially to the front, i.e. to a front end of the vehicle. Accordingly, the airbag 16 emerges in the area of a front semen 32 of the vehicle from the interior lining 34 of the vehicle roof and moves along the front screen 32 of the vehicle, until it finally deploys toward the passenger and forms a damping pad for any possible impact of the passenger.

The size of the mounting opening 22 is decisive to the assembly of the airbag module 14 in the roof cross member 12. In order to facilitate assembly, the mounting opening 22 substantially extends over the entire height of the roof cross member 12 on the front side 18 thereof (cf. FIG. 1) and, resp., on the rear side 20 thereof (cf. FIG. 6).

However, at the same time also efforts are made to minimize the openings in the roof cross member 12 required for the airbag module 14 so that the roof cross member 12 is not excessively weakened with respect to its structural stability and load-bearing capacity.

Therefore, hereinafter two design variants of the occupant restraint system 10 shall be discussed in detail which, although being identical as to their function, are different by the openings required for the airbag module 14 in the roof cross member 12.

FIGS. 1 through 5 illustrate a first embodiment of the occupant restraint system 10 in which both the mounting opening 22 and the deployment opening 24 are provided on the front side 18 of the roof cross member 12, wherein the deployment opening 24 corresponds to a portion of the mounting opening 22. Hence, the assembly of the airbag module 14 and later deployment of the airbag 16 are performed, upon actuation of the airbag module 14, through the same opening in the roof cross member 12 so that the roof cross member 12 is weakened to a comparatively small extent.

In said first embodiment of the occupant restraint system 10 moreover a cover 38 is provided which after assembly of the airbag module 14 covers the mounting opening 22 and which includes a deployment opening 24 smaller than the mounting opening 22.

The cover 38 may especially be a stable cover sheet which is connected to the roof cross member 12 so that it is capable of absorbing transverse forces and thus at least partly compensates for the existing weakening of the roof cross member 12.

It is evident from the FIGS. 1 and 2 that the cover 38 in the present case has a U-shaped cross-section and is attached with its lateral legs 40 to the outside of the upper side 42 and the lower side 44 of the roof cross member 12. As a consequence, with little effort a positive connection is formed by which the cover 38 is adapted to absorb transverse loads of the roof cross member 12. Furthermore, in order to secure the mounted position of the cover 38 on the roof cross member 12 according to FIG. 2, it is possible to press-fit or weld the cover 38 to the roof cross member 12.

Due to the size of the inflator 26 as well as for facilitating the assembly of the airbag module 14, the mounting opening 22 frequently has to be larger than the deployment opening 24 required for deployment of the airbag 16. In such cases the cover 38 is technically advantageous so as to reduce the weakening of the roof cross member 12.

As a mater of course, also configuration variants are imaginable in which the inflator 26 has an especially compact design and/or an especially large deployment opening 24 is desired. Then the cover 38 may be dropped, as a matter of course, so that the deployment opening 24 is identical to the mounting opening 22.

Figure 3:
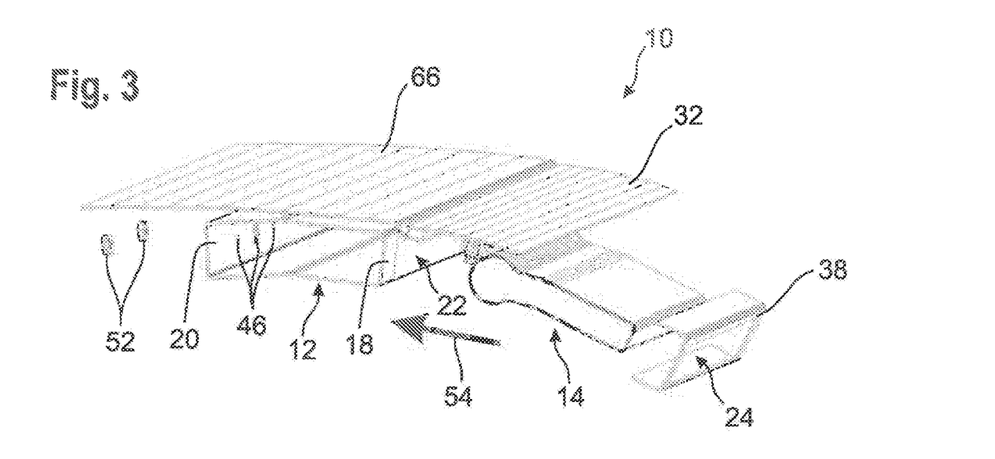
FIG. 3 shows a perspective cutout of a vehicle in the area of an occupant restraint system according to the invention prior to the assembly of an airbag module.
Figure 4:
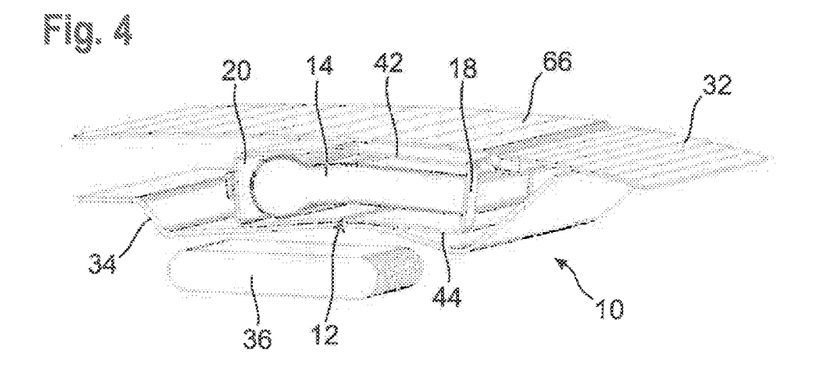
FIG. 4 shows a perspective cutout of the vehicle according to FIG. 3 after the assembly of the airbag module.

According to FIG. 3, on the rear side 20 of the roof cross member 12 opposed to the mounting opening 22 merely smaller openings 46 are provided through which, in the mounted state of the airbag module 14, fastening screws 48 for locking the airbag module 14 on the roof cross member 12 as well as an ignition connection 50 for actuating the airbag module 14 are passed (FIG. 5). From outside of the roof cross member 12 bolts 52 are subsequently screwed onto the fastening screws 48 so that the airbag module 14 is reliably fastened on the roof cross member 12 with little effort.

FIGS. 6 through 9 illustrate a second embodiment of the occupant restraint system 10 in which the rear side 20 of the roof cross member 12 includes the mounting opening 22 and the front side 18 of the roof cross member 12 includes the deployment opening 24.

While in the first embodiment of the occupant restraint system 10 according to FIGS. 1 through 5 the airbag module 14 is mounted "from the front", i.e. shows a mounting direction 54 from the front end of the vehicle in the direction of the rear end of the vehicle, the airbag module 14 according to the second embodiment of the occupant restraint system 10 is mounted "from the rear", i.e. in an opposite mounting direction 54.

In said second embodiment the roof cross member 12 is weakened, due to the separate mounting and deployment openings 22, 24, more than in the first embodiment according to FIGS. 1 through 5. However, this obvious drawback also is accompanied by advantages.

The airbag module 14 according to the second embodiment of the occupant restraint system 10 includes an inflator 26 comprising a generator plate 56, wherein in a mounted state of the airbag module 14 the generator plate completely covers the mounting opening 22 of the roof cross member 12 (cf. FIGS. 7 and 9). The generator plate 56 is especially made from a stable generator sheet which is capable of absorbing transverse loads of the roof cross member 12 analogously to the afore-described cover 38.

According to FIGS. 6 and 7, the generator plate 66 has a U-shaped cross-section analogously to the cover 38 and with its lateral legs 58 is attached to the upper side 42 and the lower side 44 of the roof cross member 12.

In addition, the generator plate 56 according to FIG. 3 includes screw openings 60 through which fastening screws 62 provided on the roof cross member 12 are passed in the mounted state of the airbag module 14 (cf. FIG. 9). Analogously to the first embodiment, the generator plate 56 and thus the entire airbag module 14 then can be fastened easily and reliably to the roof cross member 12 by bolts 64 which are screwed on from outside of the roof cross member 12.

By the second embodiment of the occupant restraint system 10 according to FIGS. 6 through 9, moreover cross-sections of the roof cross member 12 which are somewhat more compact as compared to the first embodiment can be realized.

In the first embodiment of the occupant restraint system 10 the inflator 26 is moved from the mounting opening 22 within the front side 18 of the roof cross member 12 in the axial direction to the opposite rear side 20 of the roof cross member 12, with the inflator 26 usually having a larger overall height than the folded airbag package. Accordingly, the height of the roof cross member 12 from the front side 18 to the rear side 20 has to be adapted to the higher design of the inflator 28.

On the other hand, FIG. 6 clearly shows that the height of the roof cross member 12 decreases in the axial direction from the rear side 20 to the front side 18. Said more compact wedge-shaped cross-section is facilitated in the second embodiment of the occupant restraint system 10 by the fact that, due to the opposite mounting direction 54, it is not the inflator 28 but merely the airbag package usually having a tower height which is moved axially through the roof cross member 12. Accordingly, the height of the roof cross member 12 may decrease in the axial direction toward the front side 18 and may be adapted to the smaller overall height of the folded airbag 16.

The invention claimed is:

1. A vehicle occupant restraint system comprising:
   a tubular roof cross member (12) which extends transversely to a longitudinal vehicle axis (A) and is positioned between a body and a roof lining of the vehicle,
   an airbag module (14) which comprises an airbag (16) positioned in a flexible module casing (28) and in a non-actuated initial state is accommodated inside the roof cross member (12),
   wherein the roof cross member (12) has a front side (18) facing a front end of the vehicle and an opposite rear side (20) facing a rear end of the vehicle, and
   wherein the front side (18) or the rear side (20) of the roof cross member (12) includes a mounting opening (22) for receiving the airbag module (14).

2. The occupant restraint system according to claim 1, wherein the roof cross member (12) is a hollow section.

3. The occupant restraint system according to claim 1, wherein the front side (18) or the rear side (20) of the roof cross member (12) includes a deployment opening (24) for the airbag (16) of the airbag module (14).

4. The occupant restraint system according to claim 3, wherein the deployment opening (24) corresponds to a portion of the mounting opening (22) or is identical to the mounting opening (22).

5. The occupant restraint system according to claim 4, wherein on the side of the roof cross member (12) opposed to the mounting opening (22) at least one opening (46) is provided for the passage of at least one of the following components:
   ignition connection (50) for actuating the airbag module (14);
   fastening screw (48) for locking the airbag module (14) on the roof cross member (12).

6. The occupant restraint system according to claim 1, wherein the front side (18) of the roof cross member (12) includes a deployment opening (24) for the airbag (16) of the airbag module (14), with the airbag (16) being a front airbag.

7. The occupant restraint system according to claim 1, wherein the airbag module (14) is fastened to the rear side (20) of the roof cross member (12).

8. The occupant restraint system according to claim 1, wherein the airbag module (14) includes an inflator (26) comprising a generator plate (56), wherein in a mounted state of the airbag module (14) the generator plate (56) covers the mounting opening (22) of the roof cross member (12).

9. The occupant restraint system according to claim 8, wherein in a mounted state of the airbag module (14) the generator plate (56) is positively connected to the roof cross member (12).

10. The occupant restraint system according to claim 1, wherein the roof cross member (12) includes a lower side (44) facing an interior of the vehicle and an opposite upper side (42) facing an outer roof panel (66) of the vehicle, with the lower side (44) and the upper side (42) defining a height of the roof cross member (12) which decreases in the axial direction from the rear side (20) toward the front side (18).

11. The occupant restraint system according to claim 1, wherein the airbag module (14) further includes an inflator (26) accommodated in the flexible module casing (28).

12. The occupant restraint system according to claim 1, wherein the mounting opening (22) substantially extends over the entire height of the roof cross member (12) on the respective side thereof.

13. The occupant restraint system according to any claim 1, wherein the roof cross member (12) has a bent shape when viewed transversely to the longitudinal vehicle axis (A).

14. The occupant restraint system according to claim 1, wherein the airbag module (14) is arranged above a sun visor (36) of the vehicle.

15. The occupant restraint system according to claim 1, wherein the mounting opening receives the airbag module in the direction of the longitudinal vehicle axis.

16. The occupant restraint system according to claim 1, wherein the roof cross member is formed as one piece and surrounds the airbag module, the roof cross member being bent relative to the longitudinal vehicle axis.

17. A vehicle occupant restraint system comprising:
   a roof cross member (12) which extends transversely to a longitudinal vehicle axis (A) and is part of a body of the vehicle,
   an airbag module (14) which comprises an airbag (16) and in a non-actuated initial state is accommodated inside the roof cross member (12),
   wherein the roof cross member (12) has a front side (18) facing a front end of the vehicle and an opposite rear side (20) facing a rear end of the vehicle, and
   wherein the front side (18) or the rear side (20) of the roof cross member (12) includes a mounting opening (22) for receiving the airbag module (14) and a deployment opening (24) for the airbag (16) of the airbag module (14);
   wherein a cover (38) covers the mounting opening (22) after mounting the airbag module (14) and includes the deployment opening (24).

18. The occupant restraint system according to claim 17, wherein the cover (38) has a U-shaped cross-section and with its lateral legs (40) is attached to the outside of an upper side (42) and a lower side (44) of the roof cross member (12).

19. A vehicle occupant restraint system comprising:
a tubular roof cross member extending transversely to a longitudinal vehicle axis for positioning between a vehicle body and a roof lining, the roof cross member having a front side facing a front end of the vehicle and an opposite rear side facing a rear end of the vehicle, one of the front side and the rear side including a mounting opening; and
an airbag module including an airbag extending within a flexible module casing, the airbag module in a non-actuated initial state being accommodated within the roof cross member by insertion through the mounting opening.

\* \* \* \* \*